(12) United States Patent
Maeda et al.

(10) Patent No.: US 8,497,392 B2
(45) Date of Patent: Jul. 30, 2013

(54) PROCESS FOR PRODUCING FUNCTIONALIZED CARBON NANOTUBES

(75) Inventors: Yutaka Maeda, Tokyo (JP); Takeshi Akasaka, Ibaraki (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 13/255,347

(22) PCT Filed: Mar. 11, 2010

(86) PCT No.: PCT/JP2010/054137
§ 371 (c)(1),
(2), (4) Date: Nov. 17, 2011

(87) PCT Pub. No.: WO2010/104155
PCT Pub. Date: Sep. 16, 2010

(65) Prior Publication Data
US 2012/0053358 A1 Mar. 1, 2012

(30) Foreign Application Priority Data
Mar. 12, 2009 (JP) ................................ 2009-060193

(51) Int. Cl.
*C07F 7/08* (2006.01)
(52) U.S. Cl.
USPC ............ 556/478; 556/400; 556/473; 556/480
(58) Field of Classification Search
USPC .................. 556/478, 400, 480, 473; 424/491; 423/447.1; 209/127.1
See application file for complete search history.

(56) References Cited

FOREIGN PATENT DOCUMENTS

| JP | 2007-530400 | 11/2007 |
|---|---|---|
| WO | 2004/046031 | 6/2004 |
| WO | 2007/067079 | 6/2007 |

OTHER PUBLICATIONS

Roubeau et al; Journal of Nanoscience and Nanotechnology; vol. 7 3509-3513, 2007.*
Japanese Office Action (with English translation) issued Dec. 13, 2011 in corresponding Japanese Application No. 2011-503863.
International Search Report issued May 25, 2010 in International Application No. PCT/JP2010/054137 of which the present application is the national stage.
Y. Maeda et al., Chemistry of Materials, vol. 18, No. 18, Sep. 5, 2006, pp. 4205-4208.
S. Chen et al., "A new approach to the functionalization of single-walled carbon nanotubes with both alkyl and carboxyl groups", Chemical Physics Letters, vol. 402, pp. 312-317, 2005.
J. Stephenson et al., "Highly Functionalized and Soluble Multiwalled Carbon Nanotubes by Reductive Alkylation and Arylation: the Billups Reaction", Chem. Mater., vol. 18, No. 19, pp. 4658-4661, 2006.
R. Graupner et al., "Nucleophilic-Alkylation-Reoxidation: A Functionalization Sequence for Single-Wall Carbon Nanotubes", Journal of American Chemical Society, vol. 128, pp. 6683-6689, 2006.
R. Kumashiro et al., "FET properties of chemically modified carbon nanotubes", Journal of Physics and Chemistry of Solids, vol. 69, pp. 1206-1208, 2008.
O. Roubeau et al., "Covalent Functionalization of Carbon Nanotubes Through Organometallic Reduction and Electrophilic Attack", Journal of Nanoscience and Nanotechnology, vol. 7, pp. 3509-3513, 2007.

* cited by examiner

*Primary Examiner* — Johann R Richter
*Assistant Examiner* — Pancham Bakshi
(74) *Attorney, Agent, or Firm* — Wenderoth, Lind & Ponack, L.L.P.

(57) ABSTRACT

A process for producing functionalized carbon nanotubes, which can organically modify carbon nanotubes with high efficiency, and in particular, can introduce different organic groups into carbon nanotubes with high efficiency through a series of chemical reactions, is provided.
Carbon nanotubes are allowed to react with at least one reagent selected from a silyl-substituted organometallic compound and an organometallic compound to obtain a functionalized carbon nanotube reductant, and this functionalized carbon nanotube reductant is then allowed to react with at least one reagent selected from a silyl halide compound and an organohalogen compound to obtain functionalized carbon nanotubes.

5 Claims, 13 Drawing Sheets

PROCESS FOR PRODUCING FUNCTIONALIZED CARBON NANOTUBES

TECHNICAL FIELD

The present invention relates to a process for producing functionalized carbon nanotubes.

BACKGROUND ART

In the early days of discovery of carbon nanotubes, it was expected that the side wall thereof is low in chemical reactivity similar to graphene sheets. But, at present, similar to fullerenes, there are reported various reactions with a reaction reagent of every kind.

It is also reported that by chemically functionalized carbon nanotubes, dispersibility is enhanced, or electrical resistance increases, and functionalization of the side wall greatly changes dispersibility or electronic properties of the carbon nanotubes.

Specifically, for example, for the purpose of minimizing influences given to a conjugated system by the addition to the side wall, there is made an attempt to introduce a dendrimer having a polyfunctional group introduced thereinto into the carbon nanotube side wall. Also, it is known, too that when an organosilicon substituent is introduced into the side wall, field emission properties of carbon nanotubes are enhanced, or n-type field effect transistor properties are revealed (Non-Patent Documents 2 and 3). In this way, molecular transformation by functionalization of carbon nanotubes is important in controlling properties of the carbon nanotubes.

In such chemical modification (functionalization) of carbon nanotubes, as a method of introducing an alkyl group into the carbon nanotube side wall, there are known a method of allowing single-walled carbon nanotubes to react with an alkyllithium or an alkyl Grignard reagent (Non-Patent Document 1); and a method of forming a reductive mixture with an alkali metal in anhydrous liquid ammonia and then allowing it to react by the addition of an organohalogen compound (Patent Document 1).

[Non-Patent Document 1] *J. Am. Chem. Soc.*, 2006, 128, 6683
[Non-Patent Document 2] *Chem. Mater.*, Vol. 18, No. 18, 2006, 4205 to 4208
[Non-Patent Document 3] *Journal of Physics and Chemistry of Solids*, 69 (2008), 1206 to 1208
[Patent Document 1] JP-T-2007-530400

DISCLOSURE OF INVENTION

Problem to be Solved by the Invention

However, the method of Non-Patent Document 1 adopts a method of undergoing oxidation or protonation with oxygen or an alcohol in stopping the reaction; however, a degree of functionalization modification was not always high, and there was a certain limit in the introduction amount of an organic group such as an alkyl group or the like.

Also, the method of Patent Document 1 requires the reaction at a very low temperature and also, involved such a problem that different organic groups cannot be introduced at once.

Meanwhile, in the case of introducing an excess of a substituent into the carbon nanotube side wall, since a π-conjugated system of the carbon nanotubes is broken, and its electronic properties are lost, it is especially important to control the introduction amount of the substituent.

In view of the foregoing circumstances, the present invention has been made, and a problem thereof is to provide a process for producing functionalized carbon nanotubes, which can organically functionalize carbon nanotubes with high efficiency, and in particular, can introduce different organic groups into carbon nanotubes with high efficiency through a series of chemical reactions, and a process for producing functionalized carbon nanotubes, which can control efficiency of molecular transformation by means of introduction of an organic group.

Means for Solving the Problem

In order to solve the foregoing problem, the process for producing functionalized carbon nanotubes of the present invention is characterized as follows.

(1) A process for producing functionalized carbon nanotubes, which comprises allowing carbon nanotubes to react with at least one reagent selected from a silyl-substituted organometallic compound and an organometallic compound to obtain a functionalized carbon nanotube reductant, and then allowing this functionalized carbon nanotube reductant to react with at least one reagent selected from a silyl halide compound and an organohalogen compound to obtain functionalized carbon nanotubes.

(2) The process for producing functionalized carbon nanotubes as set forth above in (1), which comprises allowing carbon nanotubes to react with an organometallic compound to obtain a functionalized carbon nanotube reductant, and then allowing this functionalized carbon nanotube reductant to react with a silyl halide compound to obtain functionalized carbon nanotubes.

(3) The process for producing functionalized carbon nanotubes as set forth above in (2), wherein the silyl halide compound has, as an organic group, at least one member selected from a saturated aliphatic hydrocarbon group, an unsaturated aliphatic hydrocarbon group, an alicyclic hydrocarbon group; an aromatic hydrocarbon group, an aromatic heterocyclic group, a hetero atom-containing group, and groups obtained by introducing a substituent into these groups.

(4) The process for producing functionalized carbon nanotubes as set forth above in (3), wherein the at least one reagent selected from a silyl halide compound has, as an organic group, at least one member selected from a saturated aliphatic hydrocarbon group and an aromatic hydrocarbon group.

(5) The process for producing functionalized carbon nanotubes as set forth above in any one of (2) to (4), wherein the organometallic compound is an organolithium compound.

(6) The process for producing functionalized carbon nanotubes as set forth above in any one of (2) to (4), wherein the organometallic compound is a Grignard reagent.

(7) The process for producing functionalized carbon nanotubes as set forth above in any one of (2) to (6), wherein the organometallic compound has, as an organic group, at least one member selected from a saturated aliphatic hydrocarbon group, an unsaturated aliphatic hydrocarbon group, an alicyclic hydrocarbon group, an aromatic hydrocarbon group, an aromatic heterocyclic group, a hetero atom-containing group, and groups obtained by introducing a substituent into these groups.

(8) The process for producing functionalized carbon nanotubes as set forth above in (7), wherein the organometallic compound has, as an organic group, at least one member selected from a saturated aliphatic hydrocarbon group and an aromatic hydrocarbon group.

(9) The process for producing functionalized carbon nanotubes as set forth above in (1), which comprises allowing carbon nanotubes to react with a silyl-substituted organometallic compound to obtain a functionalized carbon nanotube reductant, and then allowing this functionalized carbon nanotube reductant to react with an organohalogen compound to obtain functionalized carbon nanotubes.

(10) The process for producing functionalized carbon nanotubes as set forth above in (9), wherein the silyl-substituted organometallic compound is a silyllithium compound.

(11) The process for producing functionalized carbon nanotubes as set forth above in (9) or (10), wherein the silyl-substituted organometallic compound has, as an organic group, at least one member selected from a saturated aliphatic hydrocarbon group, an unsaturated aliphatic hydrocarbon group, an alicyclic hydrocarbon group, an aromatic hydrocarbon group, an aromatic heterocyclic group, a hetero atom-containing group, and groups obtained by introducing a substituent into these groups.

(12) The process for producing functionalized carbon nanotubes as set forth above in (11), wherein the silyl-substituted organometallic compound has, as an organic group, at least one member selected from a saturated aliphatic hydrocarbon group and an aromatic hydrocarbon group.

(13) The process for producing functionalized carbon nanotubes as set forth above in any one of (9) to (12), wherein the organohalogen compound has, as an organic group, at least one member selected from a saturated aliphatic hydrocarbon group, an unsaturated aliphatic hydrocarbon group, an alicyclic hydrocarbon group, an aromatic hydrocarbon group, an aromatic heterocyclic group, a hetero atom-containing group, and groups obtained by introducing a substituent into these groups.

(14) The process for producing functionalized carbon nanotubes as set forth above in (13), wherein the at least one reagent selected from a silyl halide compound has, as an organic group, at least one member selected from a saturated aliphatic hydrocarbon group and an aromatic hydrocarbon group.

Effect of the Invention

According to the present invention, carbon nanotubes can be functionalized with high efficiency, and in particular, different organic groups can be introduced into carbon nanotubes with high efficiency through a series of chemical reactions.

Also, the efficiency of molecular transformation by means of introduction of the organic group can be controlled depending upon an amount, a kind and a combination of at least one reagent selected from a silyl-substituted organometallic compound and an organometallic compound and at least one reagent selected from a silyl halide compound and an organohalogen compound. In particular, it is possible to control the addition amount of the substituent depending upon a combination of the reagents to be used (steric structures of the reagents).

Then, addition of the foregoing substituent to the carbon nanotubes is effective for revealing a new function. For example, by introducing an appropriate amount of an organosilicon substituent, it is possible to enhance field emission properties or to control field effect transistor properties.

BRIEF DESCRIPTION OF DRAWINGS

FIG. 10 is a reaction scheme for Example 1 and conventional technology of Comparative Example 1 or the like.

BEST MODE FOR CARRYING OUT THE INVENTION

Figure 1:
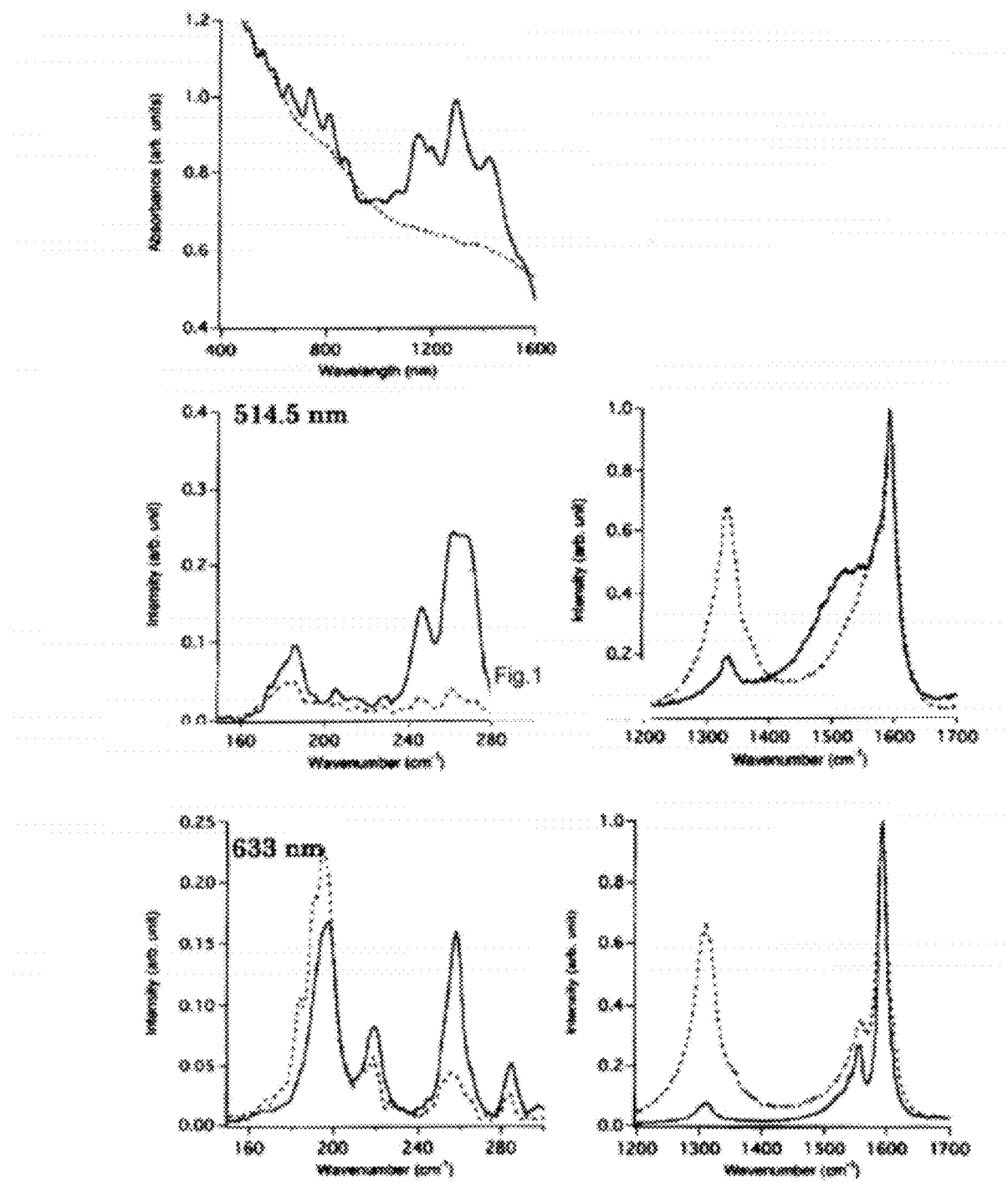
FIG. 1 is an absorption spectrum (upper level) and Raman spectra (middle level: excitation wavelength, 514.5 nm; lower level: excitation wavelength, 633 nm) of functionalized single-walled carbon nanotubes obtained in Example 1.

The present invention is hereunder described in detail.

In the present invention, functionalized carbon nanotubes are produced by a first step of allowing carbon nanotubes to react with at least one reagent selected from a silyl-substituted organometallic compound and an organometallic compound to obtain a functionalized carbon nanotube reductant; and a second step of allowing this functionalized carbon nanotube reductant to react with at least one reagent selected from a silyl halide compound and an organohalogen compound to obtain functionalized carbon nanotubes.

The carbon nanotubes which are used as a raw material in the invention are not particularly limited, and for example, single-walled carbon nanotubes or multi-walled carbon nanotubes such as double-walled carbon nanotubes or the like can be used. A production method of the carbon nanotubes is not particularly limited, and for example, those by means of a HiPco method, an arc method, a laser ablation method, a CVD method or the like can be adopted.

In a preferred embodiment according to the invention, carbon nanotubes are allowed to react with an organometallic compound to obtain a functionalized carbon nanotube reductant, and this functionalized carbon nanotube reductant is allowed to react with a silyl halide compound to obtain functionalized carbon nanotubes. This embodiment is hereunder described.

In the first step, a compound in which an organic group bonds to a metal by a carbon-metal bond can be used as the organometallic compound. Examples of the organic group include a saturated aliphatic hydrocarbon group, an unsaturated aliphatic hydrocarbon group, an alicyclic hydrocarbon group, an aromatic hydrocarbon group, an aromatic heterocyclic group, a hetero atom-containing group, and groups obtained by introducing a substituent into these groups, and so on.

Examples of the saturated aliphatic hydrocarbon group include a $C_1$-$C_{18}$ alkyl group such as a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a neo-pentyl group, a tert-pentyl group, an n-hexyl group, an n-heptyl group, an n-octyl group, an n-nonyl group, an n-decyl group, or the like; and so on.

Examples of the unsaturated aliphatic hydrocarbon group include a $C_2$-$C_{18}$ alkenyl group such as a vinyl group, an allyl group or the like; a $C_2$-$C_{18}$ alkynyl group such as an ethynyl group or the like; and so on.

Examples of the alicyclic hydrocarbon group include a $C_3$-$C_{18}$ cycloalkyl group such as a cyclohexyl group, a cycloheptyl group, a cyclooctyl group, a norbornyl group or the like; a $C_3$-$C_{18}$ cycloalkenyl group such as a cyclohexenyl group or the like; and so on.

Examples of the aromatic hydrocarbon group include a $C_6$-$C_{18}$ aryl group such as a phenyl group, a naphthyl group or the like; a $C_6$-$C_{18}$ arylalkyl group such as a benzyl group, a phenethyl group or the like; and so on.

Examples of the aromatic heterocyclic group include a $C_4$-$C_{18}$ monocyclic or polycyclic heterocyclic group such as a pyrrolyl group, a furanyl group, a thienyl group, an imidazolyl group, an oxazolyl group, a thiazolyl group, a pyrazolyl group, a pyridyl group, a pyridazyl group, a pyrimidyl group or the like; and so on.

Examples of the hetero atom-containing group include a $C_2$-$C_{18}$ hetero atom-containing group such as an ether bond-containing group, a thioether bond-containing group, a carbonyl group-containing group, an ester bond-containing group, an amide bond-containing group or the like; and so on.

Examples of the substituent which is introduced into the foregoing organic group include a halogen atom, a hydroxyl group, an amino group, a $C_1$-$C_6$ alkyl group, a $C_2$-$C_6$ alkenyl group, a $C_1$-$C_6$ alkoxy group, a $C_2$-$C_6$ alkoxycarbonyl group, a $C_6$-$C_{10}$ aryloxy group, a $C_2$-$C_8$ dialkylamino group, a $C_2$-$C_8$ acyl group, and so on.

As to the organometallic compound, for example, a reagent of every kind which is used for the reaction can be synthesized by allowing an organohalogen compound to react with a metal such as lithium, magnesium or the like. As the organometallic compound, for example, an organolithium compound, a Grignard reagent or the like can be used.

Though the organolithium compound is not particularly limited, examples thereof include a $C_1$-$C_{18}$ alkyllithium such as methyllithium, ethyllithium, n-propyllithium, isopropyllithium, n-butyllithium, isobutyllithium, sec-butyllithium, tert-butyllithium or the like; a $C_6$-$C_{18}$ aryllithium such as phenyllithium or the like; and so on.

As the Grignard reagent, one represented by the general formula: R—MgX (R represents an organic group, and X represents a halogen atom) can be used. Examples thereof include a $C_1$-$C_{18}$ alkylmagnesium bromide such as methylmagnesium bromide, ethylmagnesium bromide, n-propylmagnesium bromide, isopropylmagnesium bromide, n-butylmagnesium bromide, isobutylmagnesium bromide, sec-butylmagnesium bromide, tert-butylmagnesium bromide or the like; a $C_1$-$C_{18}$ alkylmagnesium iodide such as methylmagnesium iodide, ethylmagnesium iodide, n-propylmagnesium iodide, isopropylmagnesium iodide, n-butylmagnesium iodide, sec-butylmagnesium iodide, tert-butylmagnesium iodide or the like; a $C_6$-$C_{18}$ arylmagnesium bromide such as phenylmagnesium bromide or the like; a $C_6$-$C_{18}$ arylmagnesium iodide such as phenylmagnesium iodide or the like; and so on.

The reaction in the first step can be, for example, carried out by dispersing carbon nanotubes in an organic solvent in an atmosphere of an inert gas or the like and then adding dropwise an organometallic compound, followed by optionally undergoing stirring, ultrasonic processing or the like. Though a reaction temperature is not particularly limited, the reaction can be, for example, carried out at from −78° C. to room temperature.

A use amount of the organometallic compound reagent is not particularly limited, and it may be an excessive amount relative to the carbon nanotubes. But, by making the amount of the subject reagent small relative to the amount of the carbon nanotubes, a degree of functionalization can be adjusted.

As the organic solvent for the reaction in the first step, for example, an aromatic hydrocarbon such as benzene or the like, an ether such as diethyl ether, tetrahydrofuran or the like, cyclohexane, and so on can be used solely or in admixture.

In the second step, as the silyl halide compound, a primary, secondary or tertiary organic group-containing silicon compound having a silicon-halogen bond can be used. As the organic group, for example, those exemplified in the foregoing organometallic compound are exemplified. Examples of the halogen atom bonding to silicon include chlorine, bromine, iodine, and so on.

The reaction in the second step can be, for example, carried out by adding a silyl halide compound in a reaction vessel after completion of the reaction in the foregoing first step and undergoing stirring. Though a reaction temperature is not particularly limited, the reaction can be, for example, carried out at from −78° C. to room temperature.

A use amount of the silyl halide compound is not particularly limited, and it may be an excessive amount relative to the carbon nanotubes. But, by making the amount of the subject reagent small relative to the amount of the carbon nanotubes, a degree of functionalization can be adjusted.

After completion of the reaction, by washing with ion exchanged water, an acid or the like, the functionalized carbon nanotubes can be obtained.

In another preferred embodiment according to the invention, carbon nanotubes are allowed to react with a silyl-substituted organometallic compound to obtain a functionalized carbon nanotube reductant, and this functionalized carbon nanotube reductant is then allowed to react with an organohalogen compound to obtain functionalized carbon nanotubes. This embodiment is hereunder described.

In the first step, as the silyl-substituted organometallic compound, a primary, secondary or tertiary organic group-containing silicon compound having a silicon-metal bond can be used. As the organic group, for example, those exemplified in the foregoing organometallic compound are exemplified. Examples of a metal species bonding to silicon include an alkali metal such as Li, Na or the like; and so on. Above all, a primary, secondary or tertiary silyllithium compound is preferable.

The reaction in the first step can be, for example, carried out by dispersing carbon nanotubes in an organic solvent in an atmosphere of an inert gas or the like and then adding dropwise a silyl-substituted organometallic compound, followed by optionally undergoing stirring, ultrasonic processing or the like. Though a reaction temperature is not particularly limited, the reaction can be, for example, carried out at from −78° C. to room temperature.

A use amount of the silyl-substituted organometallic compound reagent is not particularly limited, and it may be an excessive amount relative to the carbon nanotubes. But, by making the amount of the subject reagent small relative to the amount of the carbon nanotubes, a degree of functionalization can be adjusted.

As the organic solvent for the reaction in the first step, for example, an aromatic hydrocarbon such as benzene or the like, an ether such as diethyl ether, tetrahydrofuran or the like, cyclohexane, and so on can be used solely or in admixture.

In the second step, as the organohalogen compound, a compound in which an organic group bonds to a halogen atom such as chlorine, bromine, iodine or the like by a carbon-halogen bond can be used. As the organic group, for example, those exemplified in the foregoing organometallic compound are exemplified.

The reaction in the second step can be, for example, carried out by adding the organohalogen compound in a reaction vessel after completion of the reaction in the foregoing first step and undergoing stirring. Though a reaction temperature is not particularly limited, the reaction can be, for example, carried out at from −78° C. to room temperature.

A use amount of the organohalogen compound is not particularly limited, and it may be an excessive amount relative to the carbon nanotubes. But, by making the amount of the subject reagent small relative to the amount of the carbon nanotubes, a degree of functionalization can be adjusted.

After completion of the reaction, by washing with ion exchanged water, an acid or the like, the functionalized carbon nanotubes can be obtained.

Incidentally, in the present invention, in addition to the above-described respective embodiments, for example, the functionalized carbon nanotubes can also be obtained by allowing carbon nanotubes to react with an organometallic compound to obtain a functionalized carbon nanotube reductant and then allowing this organic modified carbon nanotube reductant to react with an organohalogen compound.

EXAMPLES

The present invention is hereunder described in more detail with reference to the following Examples, but it should be construed that the present invention is not limited to these Examples at all.

Example 1

10 mg of single-walled carbon nanotubes (HiPco method) were added in a three-necked flask as a reaction vessel under Ar atmosphere. Subsequently, 100 mL of dry benzene was added, followed by ultrasonic processing for 30 minutes.

Subsequently, 6.3 mmoles in total of tert-butyllithium was added dropwise. Thereafter, the mixture was stirred for 30 minutes, subjected to ultrasonic processing for 30 minutes and further stirred with a stirrer for one hour.

Subsequently, 13 mmoles in total of n-butyl bromide was added dropwise in the reaction vessel, and the mixture was stirred with a stirrer for one hour. Thereafter, 50 mL of cyclohexane was added, and the mixture was washed twice with ion exchanged water, once with 1M hydrochloric acid and once with ion exchanged water.

Comparative Example 1

10 mg of single-walled carbon nanotubes (HiPco method) were added in a three-necked flask as a reaction vessel, under Ar atomosphere atmosphere. Subsequently, 100 mL of dry benzene was added, followed by ultrasonic processing for 30 minutes.

Subsequently, 6.3 mmoles in total of tert-butyllithium was added dropwise. Thereafter, the mixture was stirred for 30 minutes, subjected to ultrasonic processing for 30 minutes and further stirred with a stirrer for one hour. Thereafter, ethanol was added in the reaction vessel. 50 mL of cyclohexane was further added, and the mixture was washed twice with ion exchanged water, once with 1M hydrochloric acid and once with ion exchanged water.

A reaction scheme of each of the foregoing Example 1 and the conventional technology of the foregoing Comparative Example 1 or the like is shown below.

Figure 10:
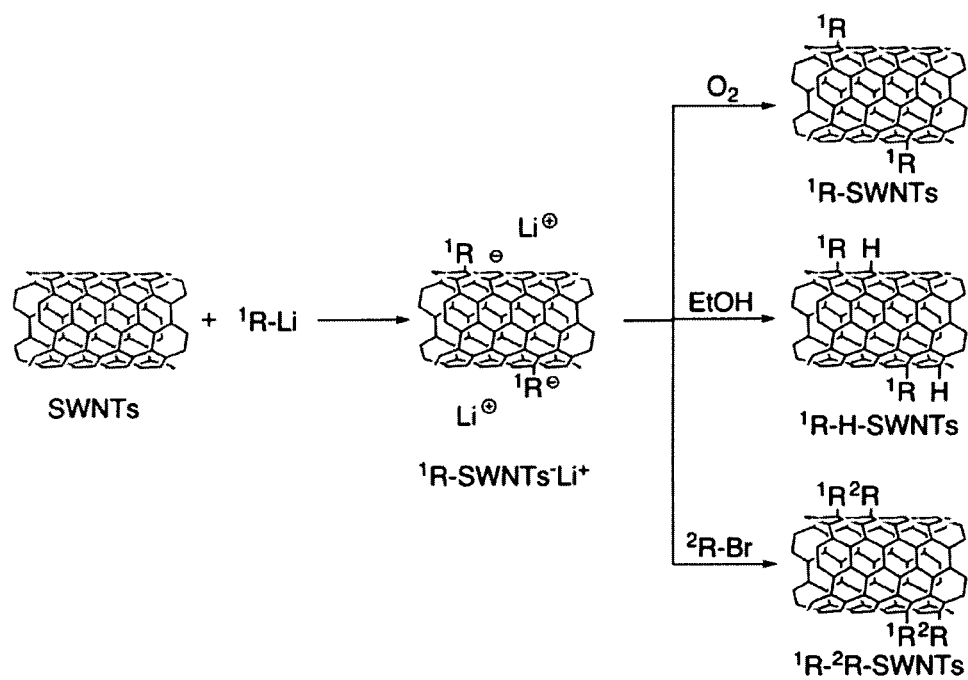

See FIG. 10 depicting a reaction scheme of each of the foregoing Example 1 and the conventional technology of the foregoing Comparative Example 1 or the like.

Figure 2:
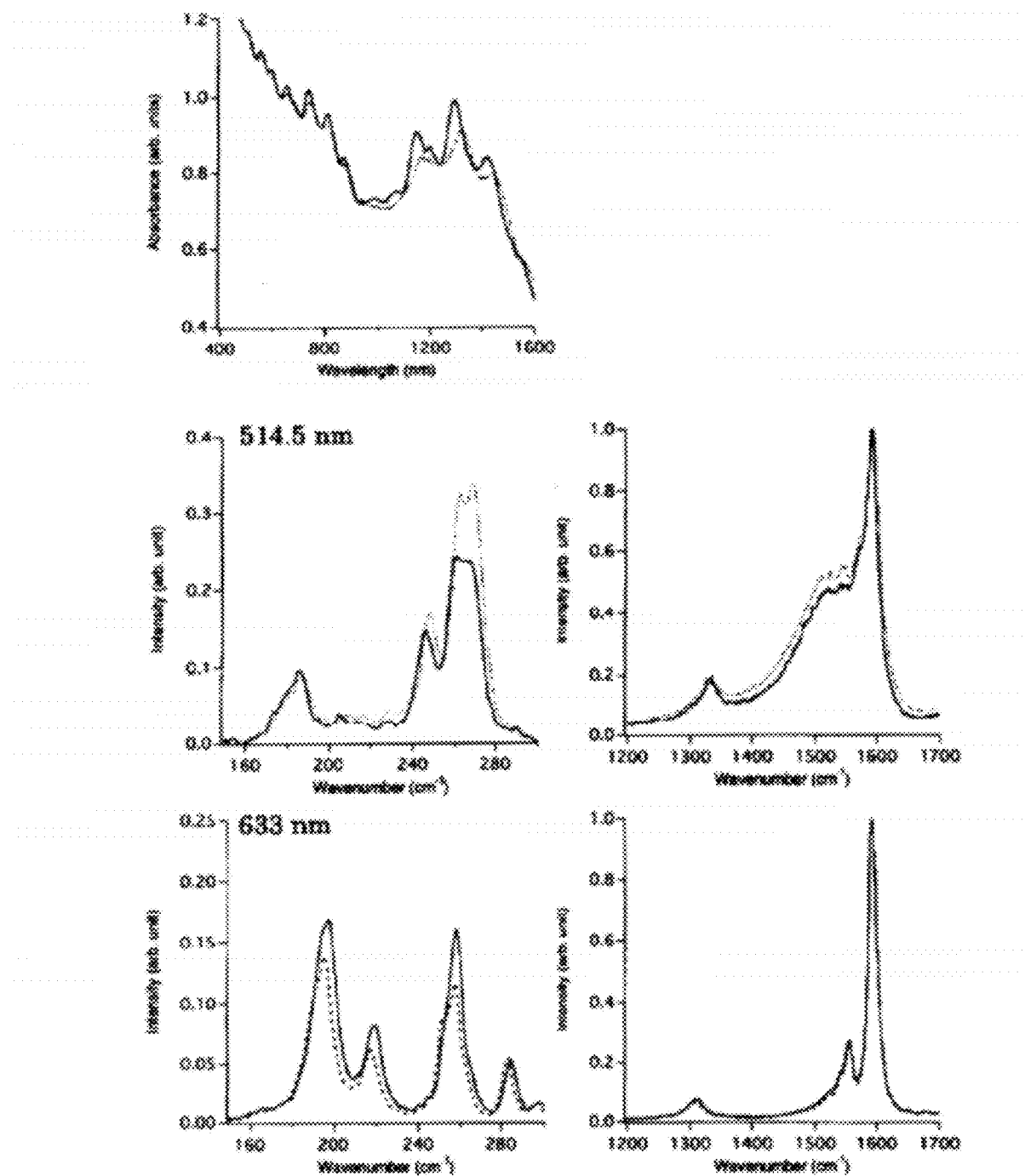
FIG. 2 is an absorption spectrum (upper level) and Raman spectra (middle level: excitation wavelength, 514.5 nm; lower level: excitation wavelength, 633 nm) of functionalized single-walled carbon nanotubes obtained in Comparative Example 1.

In the conventional technology in the upper level and middle level on the right-hand side of the foregoing reaction scheme, after the reaction of the single-walled carbon nanotubes and the organolithium compound $R^1$—Li, the reaction mixture is treated with oxygen or ethanol; whereas in Example 1, after the reaction of the single-walled carbon nanotubes and the organolithium compound $R^1$—Li, the obtained functionalized single-walled carbon nanotube reductant is allowed to react with the organohalogen compound $R^2$—X to obtain the functionalized single-walled carbon nanotubes. A difference in reaction efficiency (degree of functionalization modification) by this difference of the reaction scheme was evaluated in terms of a proportion of a decrease of characteristic absorption of an absorption spectrum, a decrease of RBM of a Raman spectrum and an increase of D-band. An absorption spectrum and a Raman spectrum of the functionalized single-walled carbon nanotubes obtained in Example 1 are shown in FIG. 1, and an absorption spectrum and a Raman spectrum of the functionalized single-walled carbon nanotubes obtained in Comparative Example 1 are shown in FIG. 2.

[Evaluation of Degree of Functionalization]

It is reported that in a reaction in which dichlorocarbene is added to single-walled carbon nanotubes, when a degree of functionalization to the side wall increases, characteristic absorption decreases, RBM decreases, and D-band increases (*J. Am. Chem. Soc.*, 2003, 125, 14893).

In comparing the absorption spectra of Example 1 and Comparative Example 1 (in the upper level of each of FIGS. 1 and 2, a solid line shows an absorption spectrum of the single-walled carbon nanotubes before the reaction, and a broken line shows an absorption spectrum of the functionalized single-walled carbon nanotubes after the reaction), a decrease in the characteristic absorption of Example 1 was found, and an enhancement in the reaction efficiency was confirmed.

As to the Raman spectrum, selectivity of the reaction under each reaction condition can be evaluated from RBM, and a relative rate of addition reaction can be evaluated from a D-band/G-band ratio. However, from FIGS. 1 and 2 (in each of FIGS. 1 and 2, the middle level is concerned with an excitation wavelength of 514.5 nm, and the lower level is concerned with an excitation wavelength of 633 nm; and a solid line shows a Raman spectrum of the single-walled carbon nanotubes before the reaction, and a broken line shows a Raman spectrum of the functionalized single-walled carbon nanotubes after the reaction), in Example 1, RBM decreased (the left-hand graph in FIG. 1), and an increase of a D-band/

G-band ratio was found (the right-hand graph in FIG. 2). In this way, an increase of the reaction efficiency was confirmed in Example 1.

Example 2

Functionalized single-walled carbon nanotubes were synthesized in the same manner as that in Example 1, except for changing the organolithium compound $R^1$—Li and the organohalogen compound $R^2$—X in various ways as shown in Table 1.

Measurement results of D-band/G-band ratio of the functionalized single-walled carbon nanotubes obtained in each of reactions estimated from the Raman spectra at an excitation wavelength of each of 514.5 nm and 633 nm were also shown in Table 1.

TABLE 1

| $R^1$—Li | $R^2$—X | Raman, 514.5 nm D/G ratio | Raman, 633 nm D/G ratio |
|---|---|---|---|
| | AP HiPco7 | 0.144 | 0.060 |
| tBuLi | tBuBr | 0.219 | 0.071 |
| | iPrBr | 0.404 | 0.429 |
| | nBuBr | 0.825 | 0.798 |
| | BenzylBr | 0.191 | 0.147 |
| | 1-Bromo-2-methylpropane | 0.456 | 0.381 |
| | 1-Bromo-2,2-dimethylpropane | 0.162 | 0.067 |
| | EtOH | 0.158 | 0.051 |
| nBuLi | tBuBr | 0.522 | 0.640 |
| | iPrBr | 0.441 | 0.532 |
| | nBuBr | 0.487 | 0.414 |
| | BenzylBr | 0.437 | 0.383 |
| | 1-Bromo-2-methylpropane | 0.487 | 0.429 |
| | 1-Bromo-2,2-dimethylpropane | 0.233 | 0.155 |
| | EtOH | 0.197 | 0.075 |

Figure 3:
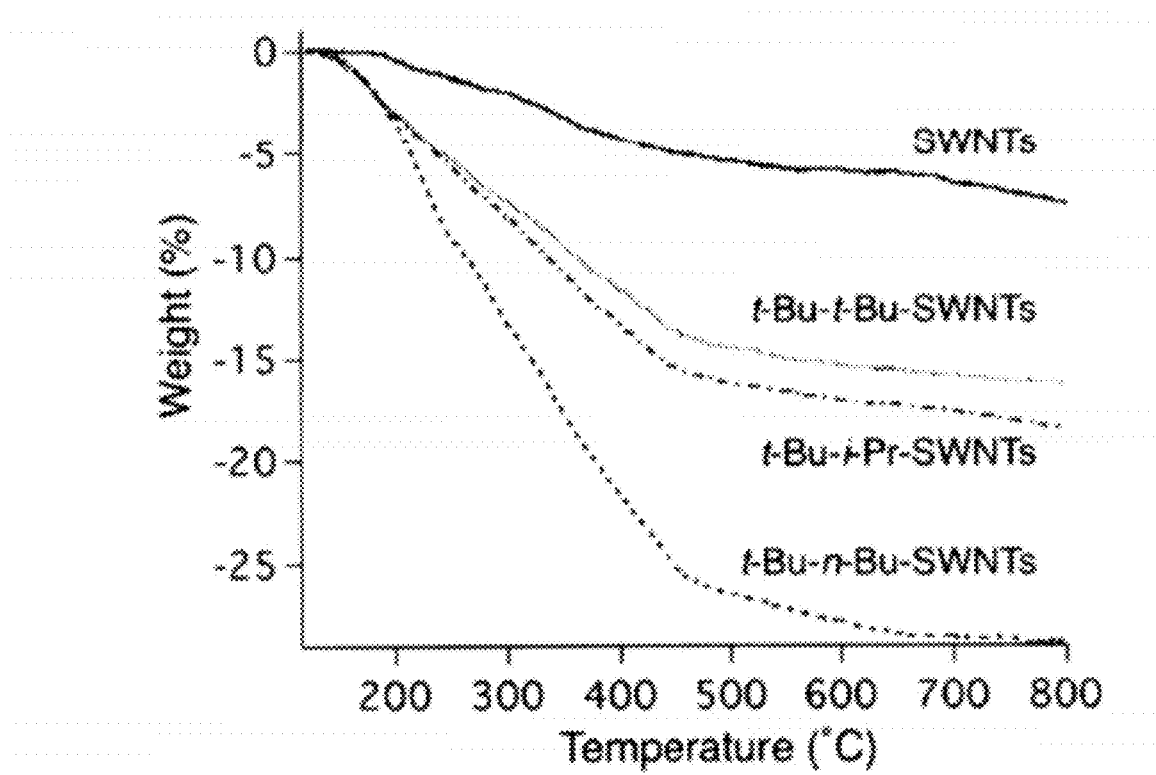
FIG. 3 shows results of thermal analysis (TGA) of functionalized single-walled carbon nanotubes (SWNTs) obtained in Example 2.

From Table 1, an enhancement of the reaction efficiency was found as a whole. The reaction efficiency varied with selection of the reaction reagent. Also, it has become clear that the addition amount of the substituent can be controlled by a combination of reagents to be used (steric structures of the reagents). Results of thermal analysis (TGA) of the functionalized single-walled carbon nanotubes obtained in Example 2 (t-Bu-t-Bu-SWNts, t-Bu-i-Pr-SWNTs and t-Bu-n-Bu-SWNTs) are shown in FIG. 3 along with results of non-functionalized SWNTs.

Example 3

Functionalized single-walled carbon nanotubes were synthesized according to the following reaction scheme under the same condition as that in Example 1, except for using a silyl halide compound in place of the organohalogen compound.

Figure 4:
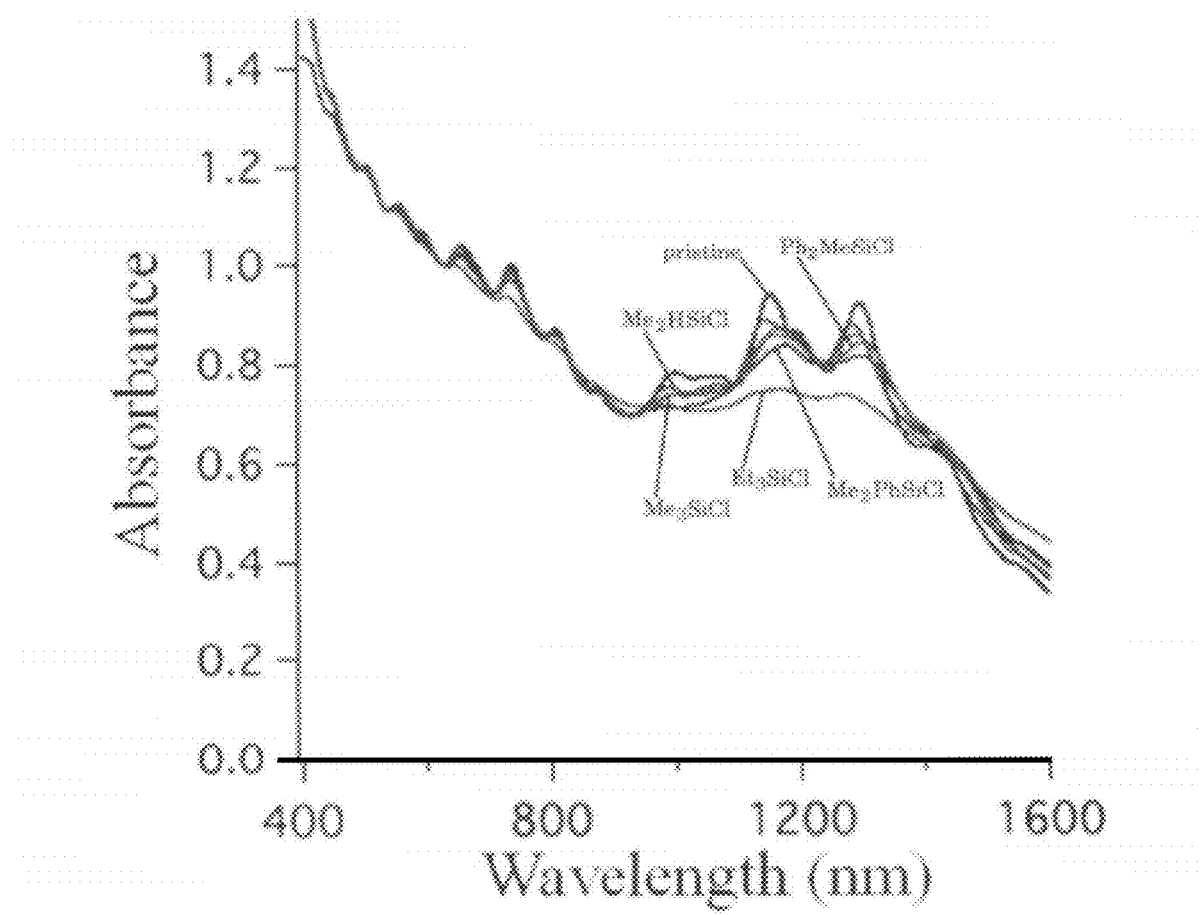
FIG. 4 is an absorption spectrum of functionalized single-walled carbon nanotubes obtained in Example 3.
Figure 5:
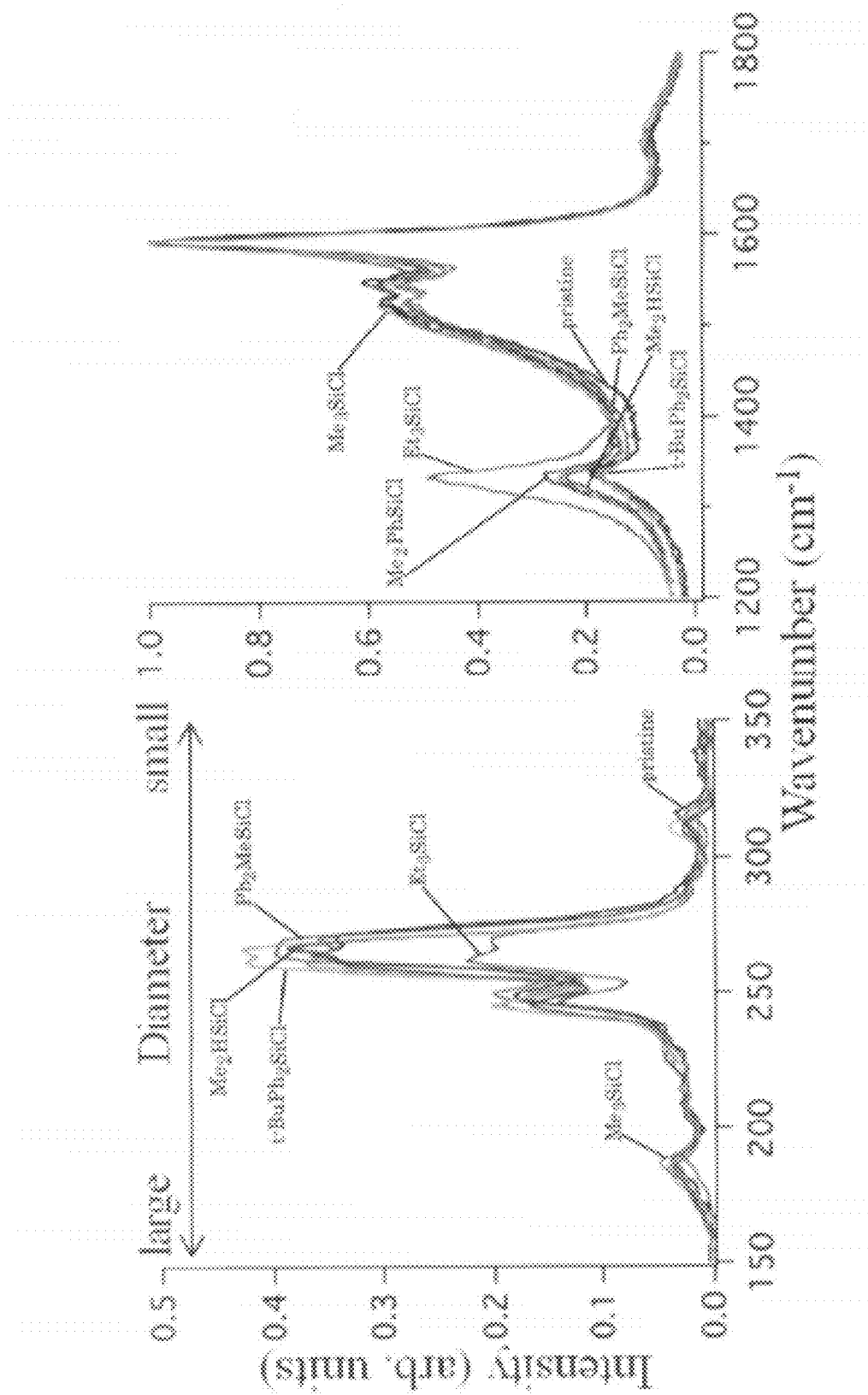
FIG. 5 is a Raman spectrum (excitation wavelength, 514.5 nm) of functionalized single-walled carbon nanotubes obtained in Example 3.
Figure 11:
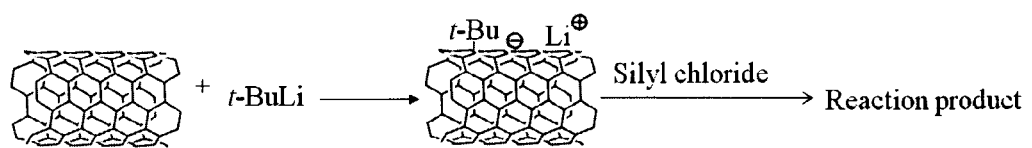
FIG. 11 is a reaction scheme for synthesizing functionalized single-walled carbon nanotubes under the same conditions as that in Example 1, except for using a silyl halide compound in place of the organohalogen compound.

See FIG. 11 depicting the reaction scheme for synthesizing functionalized single-walled carbon nanotubes under the same condition as that in Example 1, except for using a silyl halide compound in place of the organohalogen compound.

t-BuLi was used as the organometallic compound, and a compound shown in Table 2 was used as the silyl halide compound. An absorption spectrum and a Raman spectrum (excitation wavelength: 514.5 nm) of each of the functionalized single-walled carbon nanotubes obtained in Example 3 are shown in FIG. 4 and FIG. 5, respectively. Also, an absorption value (Abs: relative value to pristine SWNTs) of the functionalized single-walled carbon nanotubes obtained in each of reactions and measurement results of a D-band/G-band ratio of a Raman spectrum at an excitation wavelength of each of 514.5 nm and 633 nm are shown in Table 2.

TABLE 2

| | $Me_3SiCl$ | $Me_2HSiCl$ | $Et_3SiCl$ | $Me_2PhSiCl$ | $Ph_2MeSiCl$ | t-$BuPh_2SiCl$ |
|---|---|---|---|---|---|---|
| Abs | 1.8 | 1.3 | 9.9 | 4.1 | 2.2 | 0.7 |
| $[D/G]_{514.5}$ | 1.3 | 1.2 | 2.5 | 1.4 | 0.9 | 0.9 |
| $[D/G]_{633}$ | 3.2 | 2.6 | 8.2 | 4.1 | 2.0 | 1.4 |

In the light of above, in the case of using a silyl halide compound, not only a decrease in the characteristic absorption was found, but it was confirmed that the D-band/G-band ratio increased, and the reaction efficiency was conspicuously enhanced.

Example 4

Functionalized single-walled carbon nanotubes were synthesized according to the following reaction scheme under the same condition as that in Example 3, except for replacing t-BuLi as the organometallic compound by n-BuLi.

Figure 12:
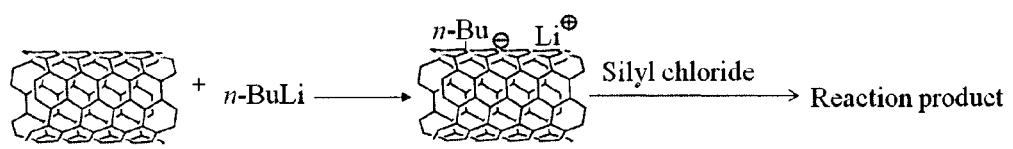
FIG. 12 is a reaction scheme for synthesizing functionalized single-walled carbon nanotubes under the same condition as that in Example 3, except for replacing t-BuLi as the organometallic compound by n-BuLi.

See FIG. 12 depicting the reaction scheme for synthesizing functionalized single-walled carbon nanotubes under the same condition as that in Example 3, except for replacing t-BuLi as the organometallic compound by n-BuLi.

Figure 6:
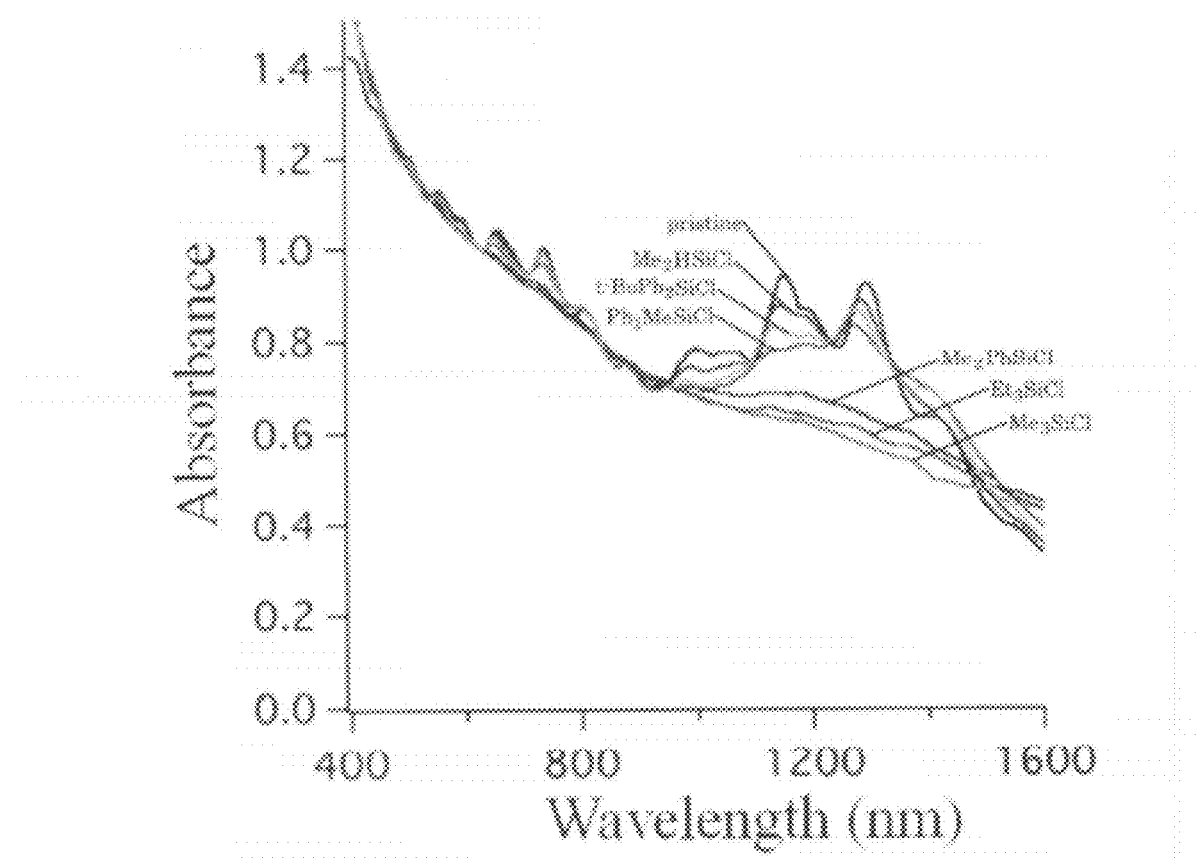
FIG. 6 is an absorption spectrum of functionalized single-walled carbon nanotubes obtained in Example 4.
Figure 7:
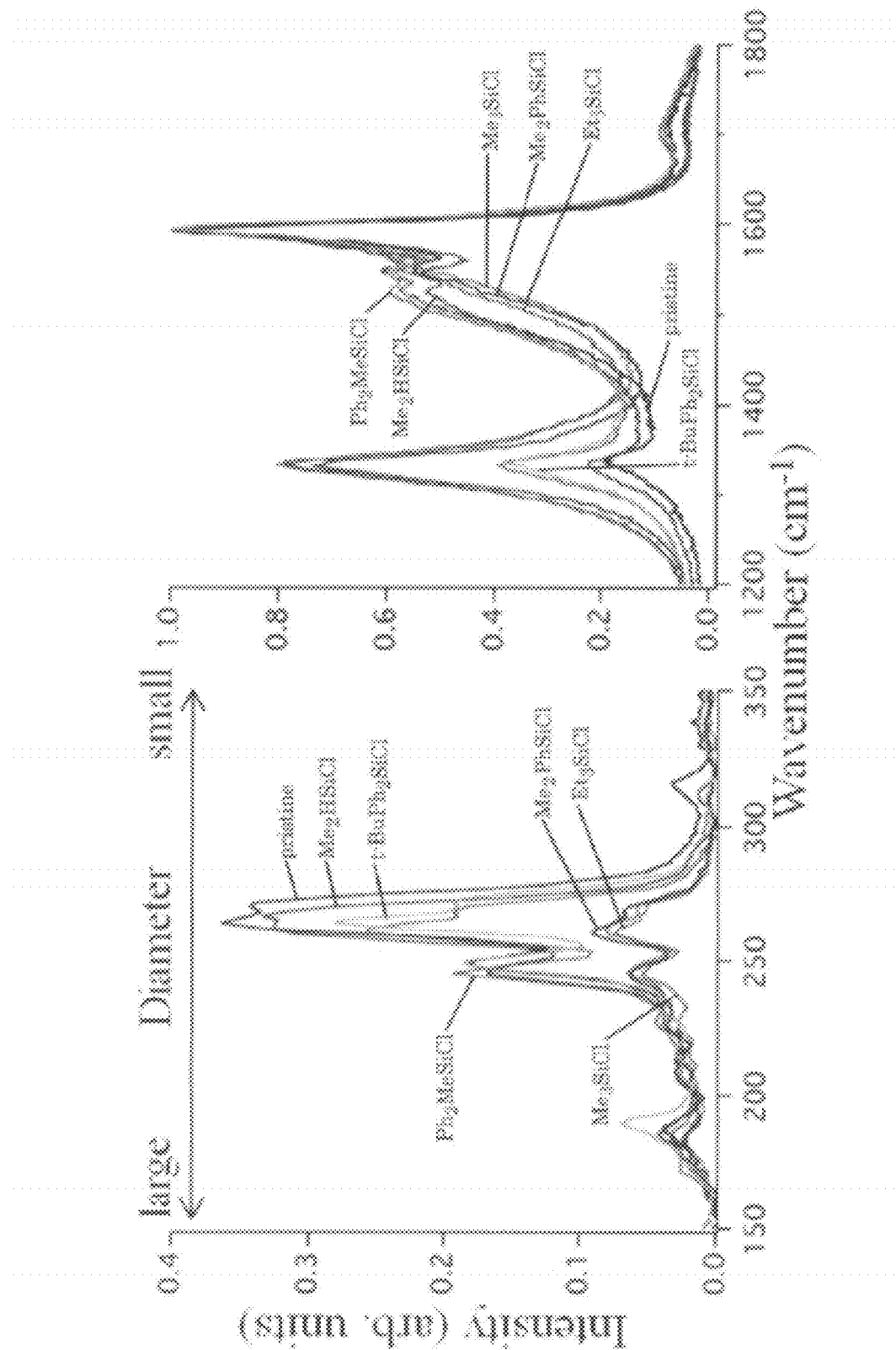
FIG. 7 is a Raman spectrum (excitation wavelength, 514.5 nm) of functionalized single-walled carbon nanotubes obtained in Example 4.

An absorption spectrum and a Raman spectrum (excitation wavelength: 514.5 nm) of each of the functionalized single-walled carbon nanotubes obtained in Example 4 are shown in FIG. 6 and FIG. 7, respectively. Also, an absorption value (Abs: relative value to pristine SWNTs) of the functionalized single-walled carbon nanotubes obtained in each of reactions and measurement results of a D-band/G-band ratio of a Raman spectrum at an excitation wavelength of each of 514.5 nm and 633 nm are shown in Table 3.

TABLE 3

| | $Me_3SiCl$ | $Me_2HSiCl$ | $Et_3SiCl$ | $Me_2PhSiCl$ | $Ph_2MeSiCl$ | t-$BuPh_2SiCl$ |
|---|---|---|---|---|---|---|
| Abs | 21.8 | 2.4 | 20.1 | 16.2 | 5.9 | 4.2 |
| $[D/G]_{514.5}$ | 4.1 | 1.7 | 4.1 | 3.8 | 2.0 | 1.9 |
| $[D/G]_{633}$ | 18.5 | 4.6 | 16.0 | 15.6 | 5.5 | 4.2 |

In the light of above, in the case of using a silyl halide compound, not only a decrease in the characteristic absorption was found, but it was confirmed that the D-band/G-band ratio increased, and the reaction efficiency was conspicuously enhanced.

Example 5

Functionalized single-walled carbon nanotubes were synthesized according to the following reaction scheme under the same condition as that in Example 1, except for using an organic silicon lithium compound in place of the organolithium compound.

Figure 8:
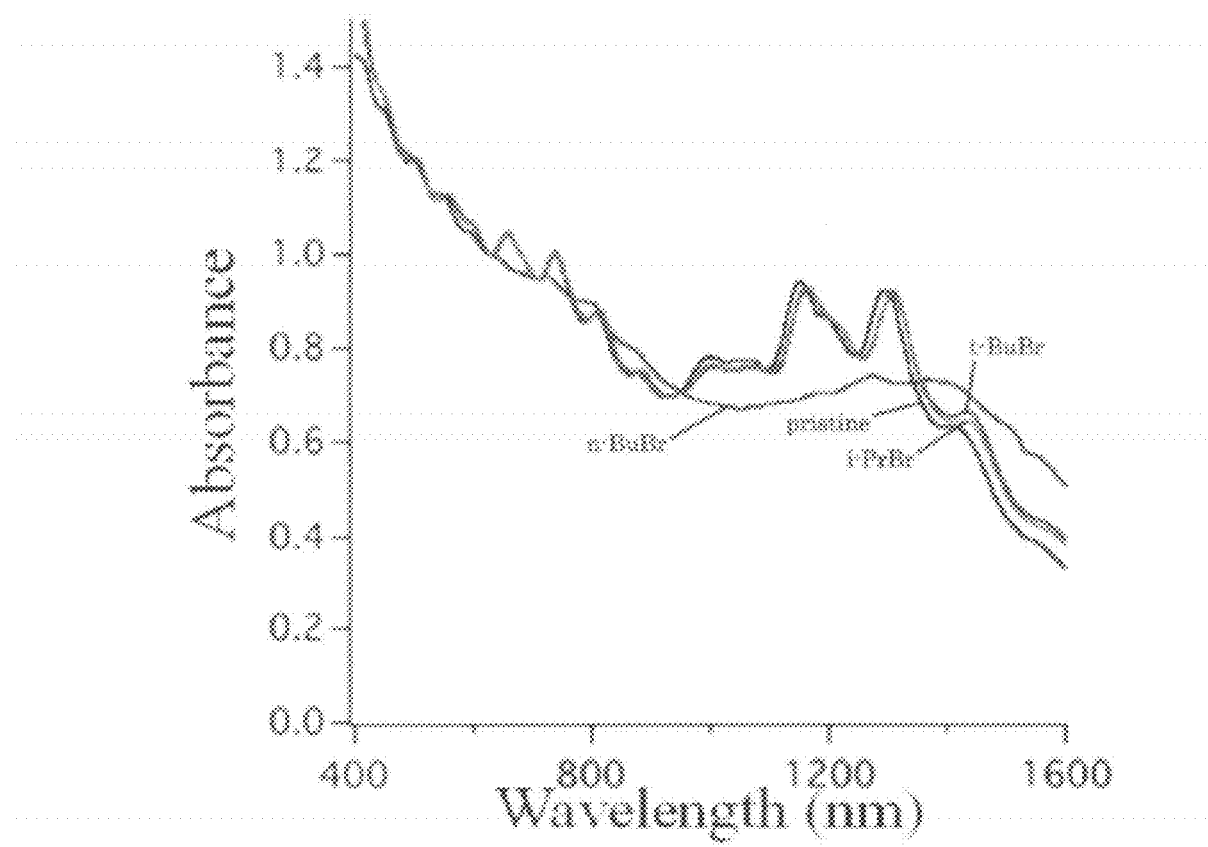
FIG. 8 is an absorption spectrum of functionalized single-walled carbon nanotubes obtained in Example 5.
Figure 9:
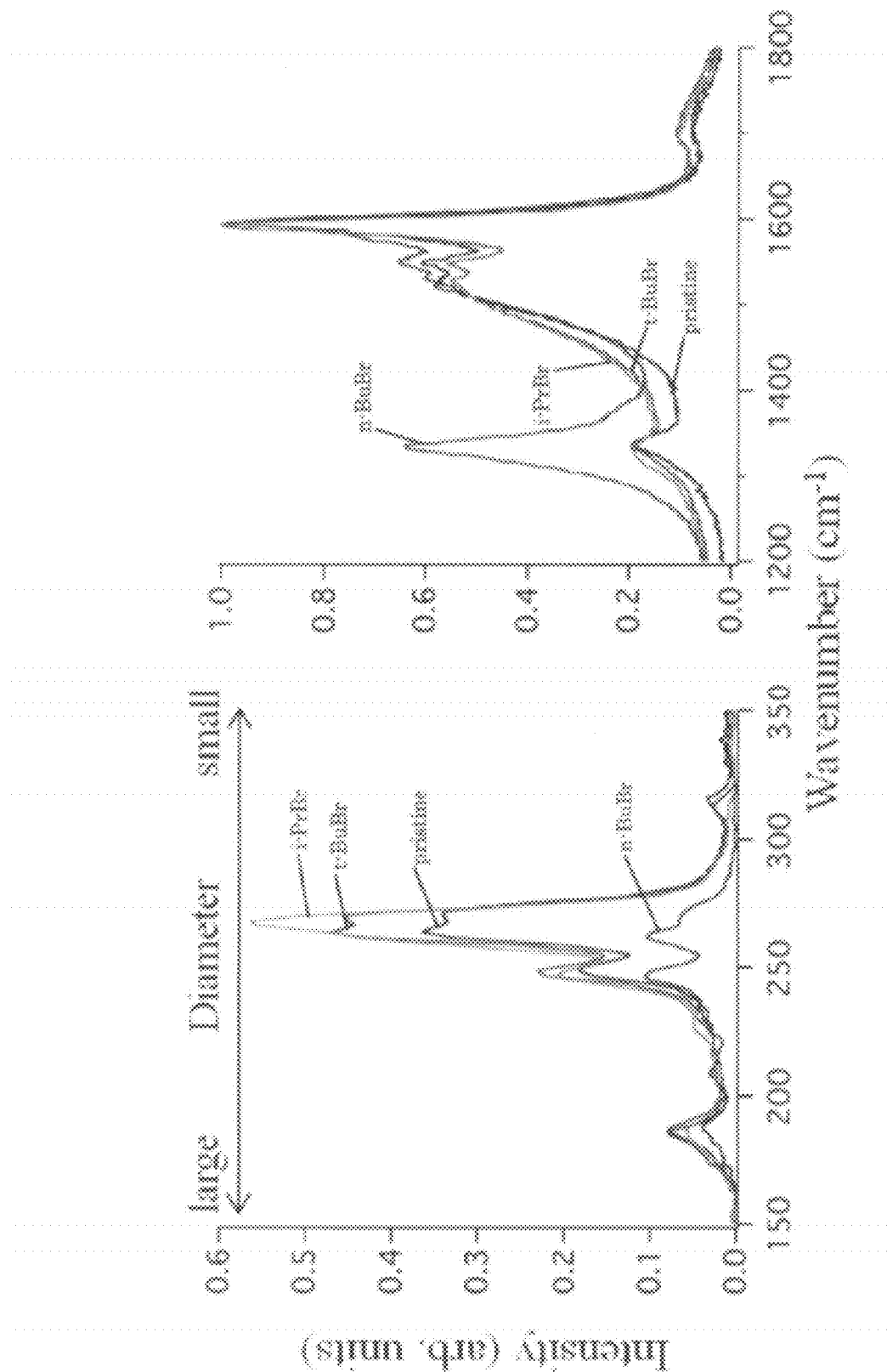
FIG. 9 is a Raman spectrum (excitation wavelength, 514.5 nm) of functionalized single-walled carbon nanotubes obtained in Example 5.
Figure 13:
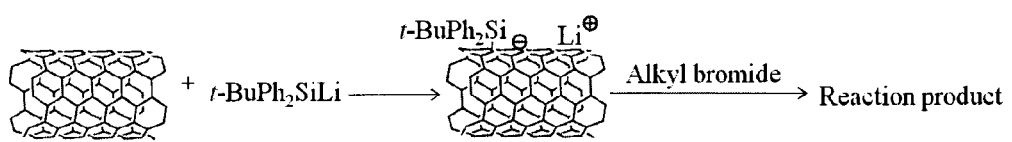
FIG. 13 is a reaction scheme for synthesizing functionalized single-walled carbon nanotubes under the same condition as that in Example 1, except for using an organic silicon lithium compound in place of the organolithium compound.

See FIG. 13 depicting the reaction scheme for synthesizing functionalized single-walled carbon nanotubes under the same condition as that in Example 1, except for using an organic silicon lithium compound in place of the organolithium compound.

t-$BuPh_2SiLi$ was used as the silyl-substituted organometallic compound, and a compound shown in Table 4 was used as the organohalogen compound. An absorption spectrum and a Raman spectrum (excitation wavelength: 514.5 nm) of each of the functionalized single-walled carbon nanotubes obtained in Example 5 are shown in FIG. 8 and FIG. 9, respectively. Also, an absorption value (Abs: relative value to pristine SWNTs) of the functionalized single-walled carbon nanotubes obtained in each of reactions and measurement results of a D-band/G-band ratio of a Raman spectrum at an excitation wavelength of each of 514.5 nm and 633 nm are shown in Table 4.

TABLE 4

|  | n-BuBr | i-PrBr | t-BuBr |
|---|---|---|---|
| Abs. | 11.5 | 0.6 | 1.2 |
| $[D/G]_{514.5}$ | 3.4 | 1.0 | 1.0 |
| $[D/G]_{633}$ | 16.4 | 1.0 | 2.0 |

In the light of above, in the case of using a silyl-substituted organometallic compound, not only a decrease in the characteristic absorption was found, but it was confirmed that the D-band/G-band ratio increased, and the reaction efficiency was conspicuously enhanced.

The invention claimed is:

1. A process for producing functionalized carbon nanotubes, which comprises
    allowing carbon nanotubes to react with an organometallic compound to obtain a functionalized carbon nanotube reductant, and then
    allowing the functionalized carbon nanotube reductant to react with a silyl-substituted organohalogen compound to obtain functionalized carbon nanotubes,
    wherein the organometallic compound is an organolithium compound, and
    wherein the silyl-substituted organohalogen compound is a silyl halide which has a silicon-halogen bond with a primary, secondary or tertiary organic group bonded to a silicon atom of the silicon-halogen bond.

2. The process for producing functionalized carbon nanotubes according to claim 1,
    wherein the primary, secondary or tertiary organic group bonded to a silicon atom of the silicon-halogen bond is at least one member selected from a saturated aliphatic hydrocarbon group, an unsaturated aliphatic hydrocarbon group, an alicyclic hydrocarbon group, an aromatic hydrocarbon group, an aromatic heterocyclic group, a hetero atom-containing group, and groups obtained by introducing a substituent into these groups.

3. The process for producing functionalized carbon nanotubes according to claim 2,
    wherein the primary, secondary or tertiary organic group bonded to a silicon atom of the silicon-halogen bond is at least one member selected from a saturated aliphatic hydrocarbon group and an aromatic hydrocarbon group.

4. The process for producing functionalized carbon nanotubes according to claim 1,
    wherein the organometallic compound has, as an organic group, at least one member selected from a saturated aliphatic hydrocarbon group, an unsaturated aliphatic hydrocarbon group, an alicyclic hydrocarbon group, an aromatic hydrocarbon group, an aromatic heterocyclic group, a hetero atom-containing group, and groups obtained by introducing a substituent into these groups.

5. The process for producing functionalized carbon nanotubes according to claim 4,
    wherein the organometallic compound has, as an organic group, at least one member selected from a saturated aliphatic hydrocarbon group and an aromatic hydrocarbon group.

* * * * *